(12) United States Patent
Lund

(10) Patent No.: US 10,993,372 B1
(45) Date of Patent: May 4, 2021

(54) ASPARAGUS SEVERING ASSEMBLY WITH HEATED VALVE UNIT, ASPARAGUS LIFTING APPARATUS WITH ASPARAGUS SPEAR GUIDES AND INTERFERING MEMBER, AND ASPARAGUS HARVESTER FORMED THEREWITH

(71) Applicant: William J. Lund, Seaside, OR (US)

(72) Inventor: William J. Lund, Seaside, OR (US)

( * ) Notice: Subject to any disclaimer, the term of this patent is extended or adjusted under 35 U.S.C. 154(b) by 0 days.

(21) Appl. No.: 16/931,920

(22) Filed: Jul. 17, 2020

(51) Int. Cl.
*A01D 45/00* (2018.01)
*F16K 49/00* (2006.01)
*H05B 3/00* (2006.01)

(52) U.S. Cl.
CPC .......... *A01D 45/007* (2013.01); *F16K 49/002* (2013.01); *H05B 3/0014* (2013.01); *H05B 2203/02* (2013.01)

(58) Field of Classification Search
CPC ................ A01D 45/007; H05B 3/0014; H05B 2203/02; F16K 49/002
See application file for complete search history.

(56) References Cited

U.S. PATENT DOCUMENTS

| | | |
|---|---|---|
| 2,581,119 A | 1/1952 | Matteoli |
| 3,636,687 A | 1/1972 | McKissick et al. |
| 3,733,459 A * | 5/1973 | Lengstorf ............. F16K 49/002 |
| | | 219/201 |
| 4,064,682 A | 12/1977 | Haws |
| 4,189,906 A | 2/1980 | Cooper |
| 4,512,145 A * | 4/1985 | Lund ..................... A01D 45/007 |
| | | 56/10.2 R |
| 7,157,670 B2 * | 1/2007 | Bargholtz ................. F03G 7/06 |
| | | 219/483 |
| 2017/0158898 A1 * | 6/2017 | Xiao ..................... C09D 11/104 |
| 2020/0146112 A1 * | 5/2020 | de Bock .............. H05B 1/0236 |

* cited by examiner

*Primary Examiner* — Adam J Behrens
(74) *Attorney, Agent, or Firm* — Parsons & Goltry, PLLC; Michael W. Goltry; Robert A. Parsons

(57) ABSTRACT

An asparagus harvester includes a chassis movable over a bed of growing asparagus. Spears above a selected height are severed at the ground by a severing assembly. A conveyor receives from a pick-up apparatus and conveys away asparagus spears severed by the severing assembly. The severing assembly includes a severing blade carried by a plunger mounted in a pneumatic cylinder. Conduits couple the pneumatic cylinder to a source of air under pressure through a valve unit operable for actuating the pneumatic cylinder to repeatedly fire and withdraw the plunger for repeatedly moving the severing blade back-and-forth along a stroke path between a raised set position and a lowered severing position proximate to the ground. A heater mounted proximate to the valve unit is configured to sufficiently heat the valve unit to enable the valve unit to operate in the presence of an ambient temperature sufficiently low to impair its operation.

10 Claims, 12 Drawing Sheets

ASPARAGUS SEVERING ASSEMBLY WITH HEATED VALVE UNIT, ASPARAGUS LIFTING APPARATUS WITH ASPARAGUS SPEAR GUIDES AND INTERFERING MEMBER, AND ASPARAGUS HARVESTER FORMED THEREWITH

FIELD OF THE INVENTION

This invention relates to asparagus harvesting and, more particularly, to asparagus severing apparatus and asparagus lifting apparatus specially adapted for use with an asparagus harvester.

BACKGROUND OF THE INVENTION

Asparagus is customarily cultivated in friable or loamy soil and is planted in beds to emerge as spears disposed in longitudinal rows or paths. The bed of growing asparagus spears surface from below the ground and extend to varying heights. It is known to harvest the spears of more than a predetermined height while leaving the remaining comparatively shorter spears to continue growing in the ground for later harvesting. Asparagus is harvested by hand or with an asparagus harvester.

A known asparagus harvester includes a chassis or frame configured to be advanced over the ground, whether by being self-propelled or towed behind a tractor, along the rows of the bed of growing asparagus and that supports a pick-up apparatus for engaging and lifting the asparagus spears, a severing apparatus, composed of a series of severing assemblies, for severing the asparagus spears proximate to the ground and a conveyor for receiving asparagus spears severed by the severing apparatus from the pick-up apparatus and conveying them to a lug box or other suitable storage area.

Each severing assembly relates to an appropriate alley defined by the asparagus harvester, is operatively connected to an actuator and to a sensor/detector, and includes a severing blade carried by a plunger mounted in a pneumatic cylinder and conduits that couple the pneumatic cylinder to a source of air under pressure through a dedicated valve unit. The valve unit is configured to switch between a firing position to supply air under pressure from the source through one of the conduits to cause the plunger to eject outwardly from the pneumatic cylinder to move the severing blade downwardly along a stroke path from a normally raised set position to a lowered severing position proximate to the ground for severing one of the asparagus spears in the path and a normal holding position to supply air under pressure from the source through another one of the conduit to cause the plunger to withdraw into the pneumatic cylinder to move the severing blade upwardly along the stroke path from its lowered severing position to its normally raised set position. As the frame advances along the rows of growing asparagus in the field, the asparagus spears of at least a pre-selected height of a corresponding row sequentially enter the alley and trigger the sensor energizing the actuator. The valve unit is controlled by the actuator under the influence of the sensor. When an impulse from the sensor is effective upon the actuator in response to the sensor detecting an asparagus spear at the alley while the chassis advances over the ground, the valve unit automatically switches to the firing position to cause the plunger in the cylinder to eject and to cause the connected severing blade to move downwardly along the stroke path from its normally raised set position to its lowered severing position proximate to the ground for severing the sensed/detected asparagus spear. The valve unit is configured to automatically switch from the firing position to the holding position when the blade completes its severing excursion, which immediately restores the blade to its normally raised set position. In the meantime, the spear has been engaged by the pick-up apparatus, which exerts an upward force on the spear but not to an extent to uproot or break the spear but only to hold and support the spear while the severing assembly does its work to sever the spear. The now severed spear is then lifted upwardly and carried somewhat rearwardly by the pick-up apparatus and is cast upon the conveyor, which conveys it to a suitable storage area supported by the chassis. This process is repeated for each asparagus spear that triggers the sensor.

The pick-up apparatus includes pick-up beds arranged one above the other from a lowermost or upstream one of the pick-up beds proximate to the ground to an uppermost or downstream one of the pick-up beds proximate to the conveyor. The pick-up apparatus normally includes two or more intermediate pick-up beds between the upstream pick-up bed and the downstream pick-up bed, although there can be just one intermediate pick-up bed between the upstream pick-up bed and the downstream pick-up bed in certain examples.

Each pick-up bed is characterized by pairs of adjacent pick-up rollers. The pick-up rollers of each pair of adjacent pick-up rollers counter-rotate with their closest portions having an inherent upward component. A pair of adjacent pick-up rollers of each of the pick-up beds relate to one of the alleys and to a corresponding one of the severing assemblies. For each alley and its corresponding severing assembly and pairs of adjacent pick-up rollers between the severing assembly and the conveyor from the upstream pick-up bed to the downstream pick-up bed, either side of an asparagus spear that enters the alley and that is of a sufficient height to trigger the corresponding sensor is engaged by the pair of adjacent pick-up rollers of the upstream pick-up bed and upon being severed is lifted upwardly thereby and handed off to and lifted in turn by each successive pair of adjacent pick-up rollers and ultimately cast onto the conveyor from the pair of adjacent pick-up rollers of the downstream pick-up bed and which transports it to the storage area. Asparagus is often harvested when the ambient temperature is sufficiently low to cause the temperature of the valve units to drop below their suitable operating temperature which impairs or otherwise disables the valve units from sufficiently switching between the firing position and the holding position and thereby inherently impairs or otherwise disables the pneumatic cylinders from sufficiently actuating the plungers along the stroke path between the normally raised set positions of the severing blades to the lowered positions of the severing blades. This leaves uncut asparagus spears and thus unfavorably influences asparagus harvesting. Furthermore, asparagus spears severed by the severing apparatus routinely eject outwardly from between adjacent pick-up beds from either side of the pick-up apparatus only to fall to the ground during harvesting operations, which also unfavorably influences asparagus harvesting. It has also been found that severed spears inadvertently fall out the back of the pick-up beds downstream of the upstream pick-up bed and onto the ground only to become lost, which also unfavorably influences asparagus harvesting. In view of at least these and other deficiencies inherent in the art, the need for continued improvement in the art is evident.

SUMMARY OF THE INVENTION

A.

According to the principle of the invention, improvements to an asparagus harvester for harvesting asparagus spears growing in the ground and projecting upwardly therefrom in a path are disclosed. The asparagus harvester includes a chassis configured to be advanced over the ground along said path and supporting a pick-up apparatus for engaging and lifting the asparagus spears, a severing assembly for severing the asparagus spears proximate to the ground and a conveyor for receiving from the pick-up apparatus and conveying away asparagus spears severed by the severing assembly, the severing assembly including a severing blade carried by a plunger mounted in a pneumatic cylinder, and conduits coupled to the pneumatic cylinder and through a valve unit to a source of air under pressure, the valve unit configured to switch between a firing position to supply air under pressure from the source through the one of the conduits to cause the plunger to eject outwardly from the pneumatic cylinder to move the severing blade downwardly along a stroke path from a raised set position to a lowered severing position proximate to the ground for severing one of the asparagus spears in the path and a holding position to supply air under pressure from the source through another one of the conduits to cause the plunger to withdraw into the pneumatic cylinder to move the severing blade upwardly along the stroke path from the lowered severing position to the raised set position.

1.

The improvements in one embodiment include a heater mounted proximate to the valve unit and configured to sufficiently heat the valve unit to enable the valve unit to switch between the firing position and the holding position in the presence of an ambient temperature sufficiently low to impair the valve unit from sufficiently switching between the firing position and the holding position. The heater is configured to activate in response to actuation of a switch operatively coupled to the heater. The heater is connected to the valve unit. The heater is connected to the valve unit with a thermally-conductive adhesive in an illustrative embodiment. The heater is a positive temperature coefficient heater in a preferred embodiment.

2.

In another embodiment, the improvements include a method including mounting a heater proximate to the valve unit, and activating the heater, the heater sufficiently heating the heater over a period of time to enable the valve unit to switch between the firing position and the holding position in the presence of an ambient temperature sufficiently low to impair the valve unit from sufficiently switching between the firing position and the holding position. The heater is configured to activate in response to actuation of a switch operatively coupled to the heater, and the step of activating the heater comprises actuating the switch. The step of mounting the heater proximate to the valve unit further includes connecting the heater to the valve unit, such as by adhering the heater to the valve unit with a thermally-conductive adhesive in an illustrative embodiment. In this embodiment, the heater is preferably a positive temperature coefficient heater.

B.

According to the principle of the invention, improvements to an asparagus harvester for harvesting asparagus spears growing in the ground and projecting upwardly therefrom in a path are disclosed. The asparagus harvester includes a chassis configured to be advanced over the ground along said path and supporting a pick-up apparatus for engaging and lifting the asparagus spears, a severing apparatus for severing the asparagus spears proximate to the ground and a conveyor for receiving from the pick-up apparatus and conveying away asparagus spears severed by the severing assembly.

1.

In one embodiment, the improvements include a spear guide disposed on either side of the pick-up apparatus for guiding the asparagus spears severed by the severing apparatus through the pick-up apparatus and currently disabling the asparagus spears severed by the severing apparatus from ejecting laterally outward from either side of the pick-up apparatus. The pick-up apparatus includes pick-up beds arranged one above the other and the spear guides are disposed between adjacent pick-up beds and define a laterally-enclosed spear-conveying area between the adjacent pick-up beds. Each of the adjacent pick-up beds has a leading end, a trailing end and a length extending longitudinally to the path from the leading end to the trailing end and the spear guides extend forwardly along the lengths from proximate to the trailing ends and to and beyond the leading ends. The spear guides project angularly outward from either side of one of the adjacent pick-up beds. In another embodiment, the spear guides are supported by support members mounted proximate to either side of one of the adjacent pick-up beds. One of the adjacent pick-up beds is a lowermost one of the pick-up beds proximate to the ground. The spear guides are shields, which are each flat in an illustrative embodiment.

2.

In another embodiment, the improvements include a method including disposing a spear guide on either side of the pick-up apparatus for guiding the asparagus spears severed by the severing apparatus through the pick-up apparatus and currently disabling the asparagus spears severed by the severing apparatus from ejecting laterally outward from either side of the pick-up apparatus. The pick-up apparatus includes pick-up beds arranged one above the other, and the step of disposing the spear guide on either side of the pick-up apparatus comprises disposing the spear guide on either side of the pick-up apparatus between adjacent pick-up beds to form a laterally-enclosed spear-conveying area between the adjacent pick-up beds. Each of the adjacent pick-up beds has a leading end, a trailing end and a length extending longitudinally to the path from the leading end to the trailing end and the spear guides extend forwardly along the lengths from proximate to the trailing ends and to and beyond the leading ends. The spear guides project angularly outward from either side of one of the adjacent pick-up beds in an illustrative embodiment. The step of disposing the spear guide on either side of the pick-up apparatus between adjacent pick-up beds includes mounting the spear guide to a support member mounted proximate to either side of one of the adjacent pick-up beds. One of the adjacent pick-up beds is a lowermost one of the pick-up beds proximate to the ground. The spear guides are shields, which are each flat in an illustrative embodiment.

C.

According to the principle of the invention, improvements to an asparagus harvester for harvesting asparagus spears growing in the ground and projecting upwardly therefrom in a path are disclosed. The asparagus harvester includes a chassis configured to be advanced over the ground along said path and supporting a pick-up apparatus for engaging and lifting the asparagus spears, a severing apparatus for severing the asparagus spears proximate to the ground and a conveyor for receiving from the pick-up apparatus and conveying away asparagus spears severed by the severing assembly, the pick-up apparatus comprises pick-up beds each including a leading end, a trailing end, a first side and a second side, and the pick-up beds are arranged one above the other and include an upper pick-up bed over a lowermost pick-up bed. The improvements include an interfering member extending across the trailing end of the upper pick-up bed from the first side to the second side and configured to disable spears severed by the severing apparatus and being lifted through the upper pick-up bed between the leading end and the trailing end from passing outwardly through the trailing end of the upper pick-up bed. The interfering member, which is an elongate bar, is carried by a support member mounted on either side of the upper pick-up bed.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
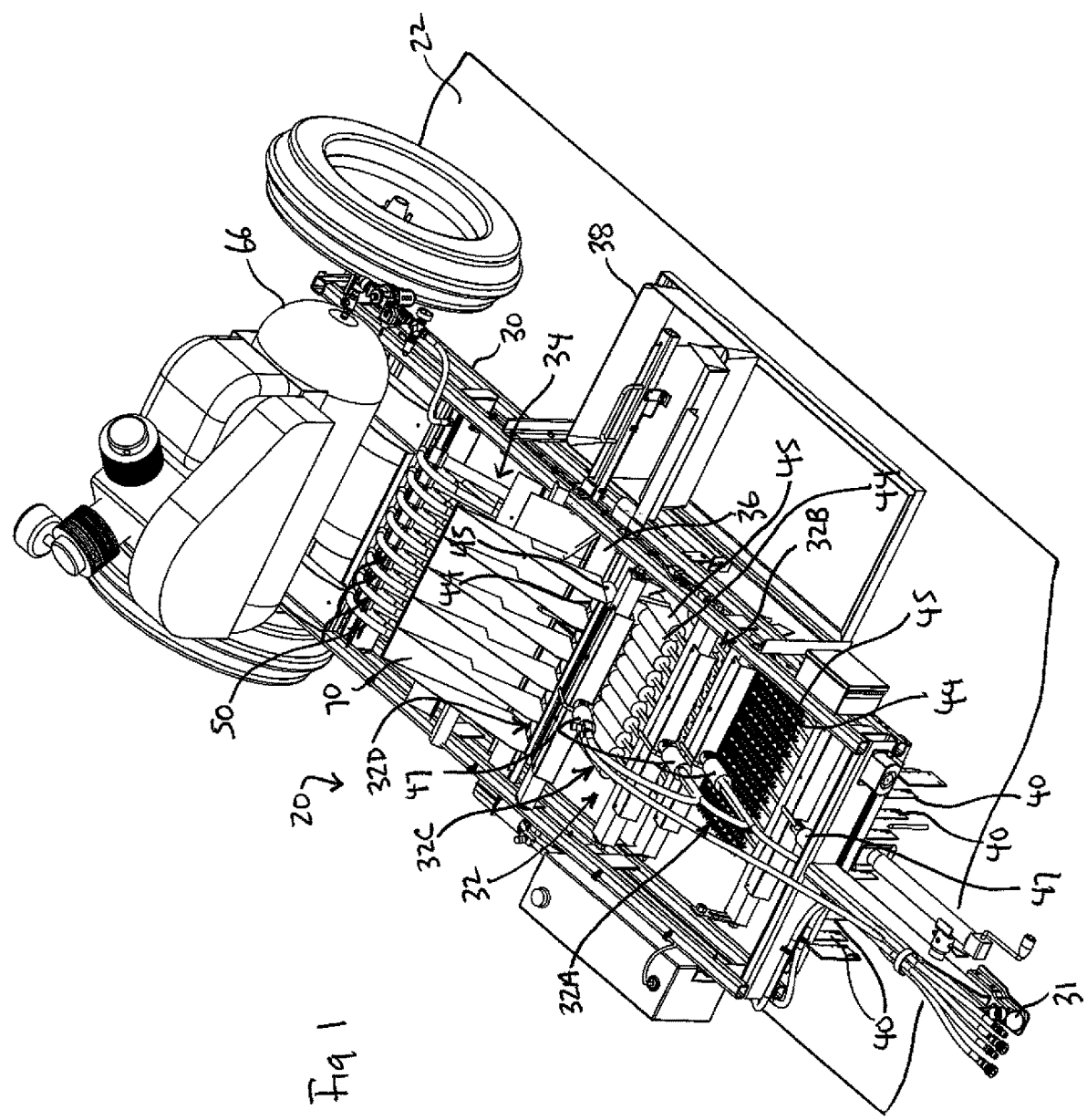
FIG. 1 is a top perspective view of an asparagus harvester embodying features of the invention.
Figure 2:
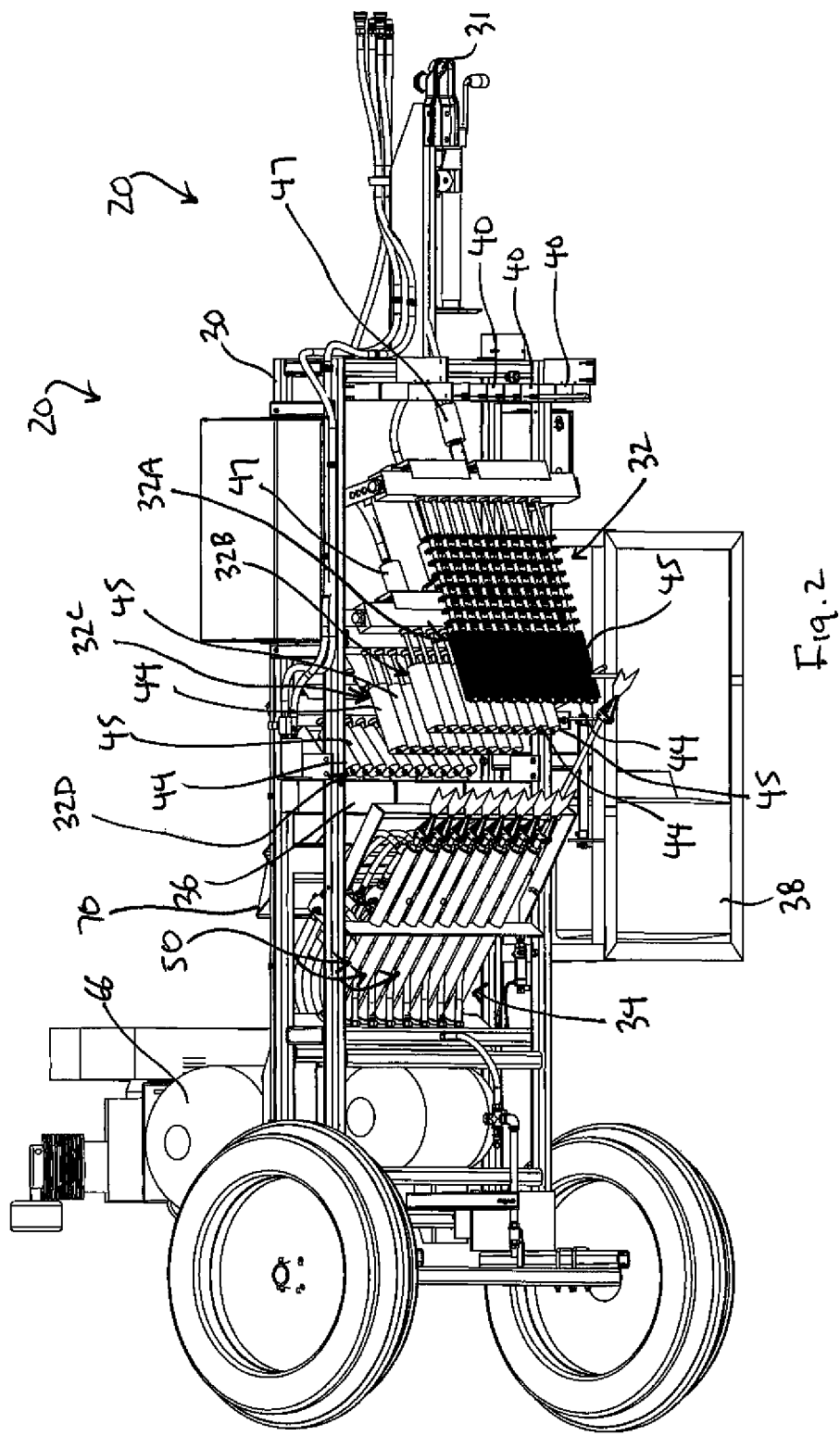
FIG. 2 is a bottom perspective view of the embodiment of FIG. 1.
Figure 3:
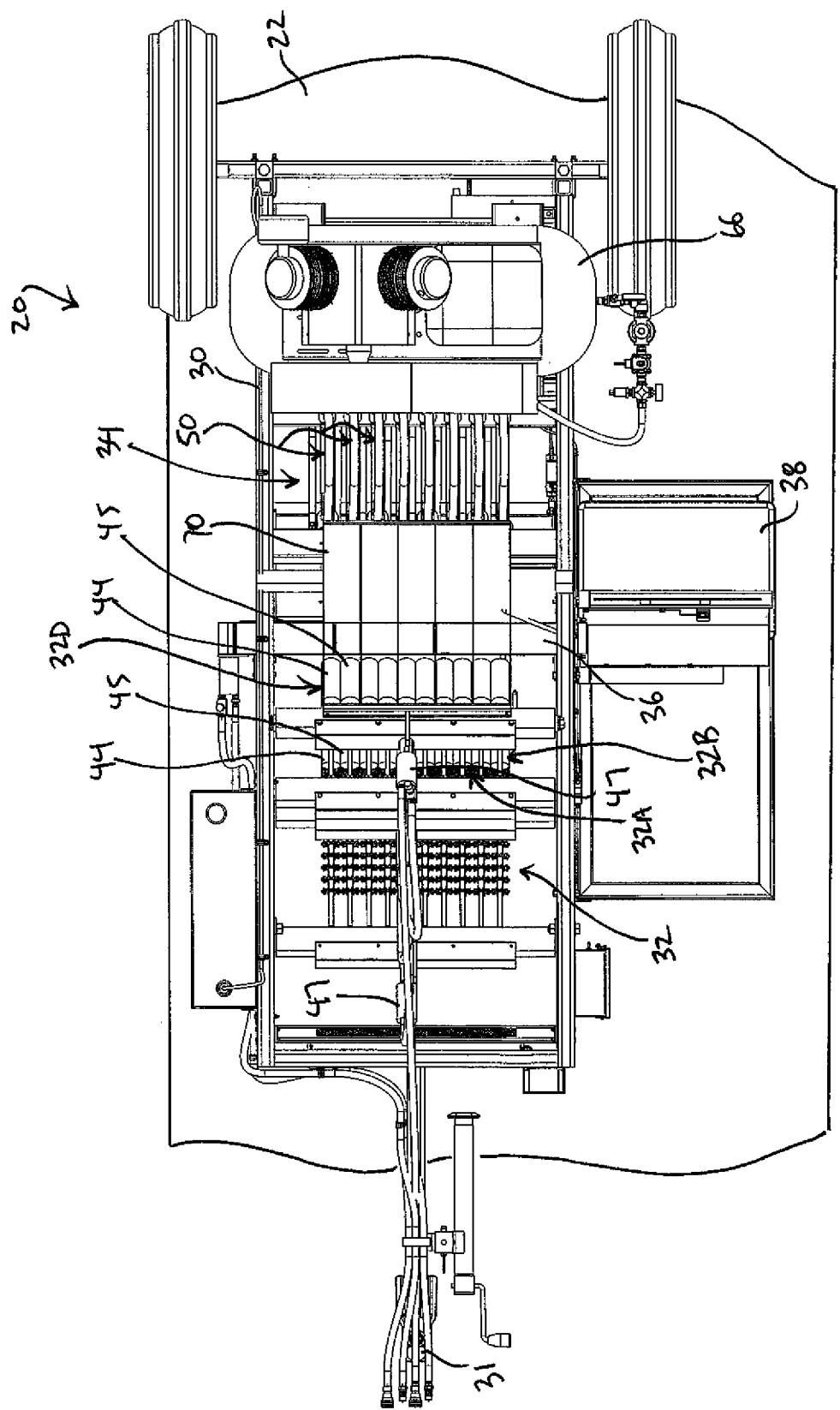
FIG. 3 is a top plan view of the embodiment of FIG. 1.
Figure 4:
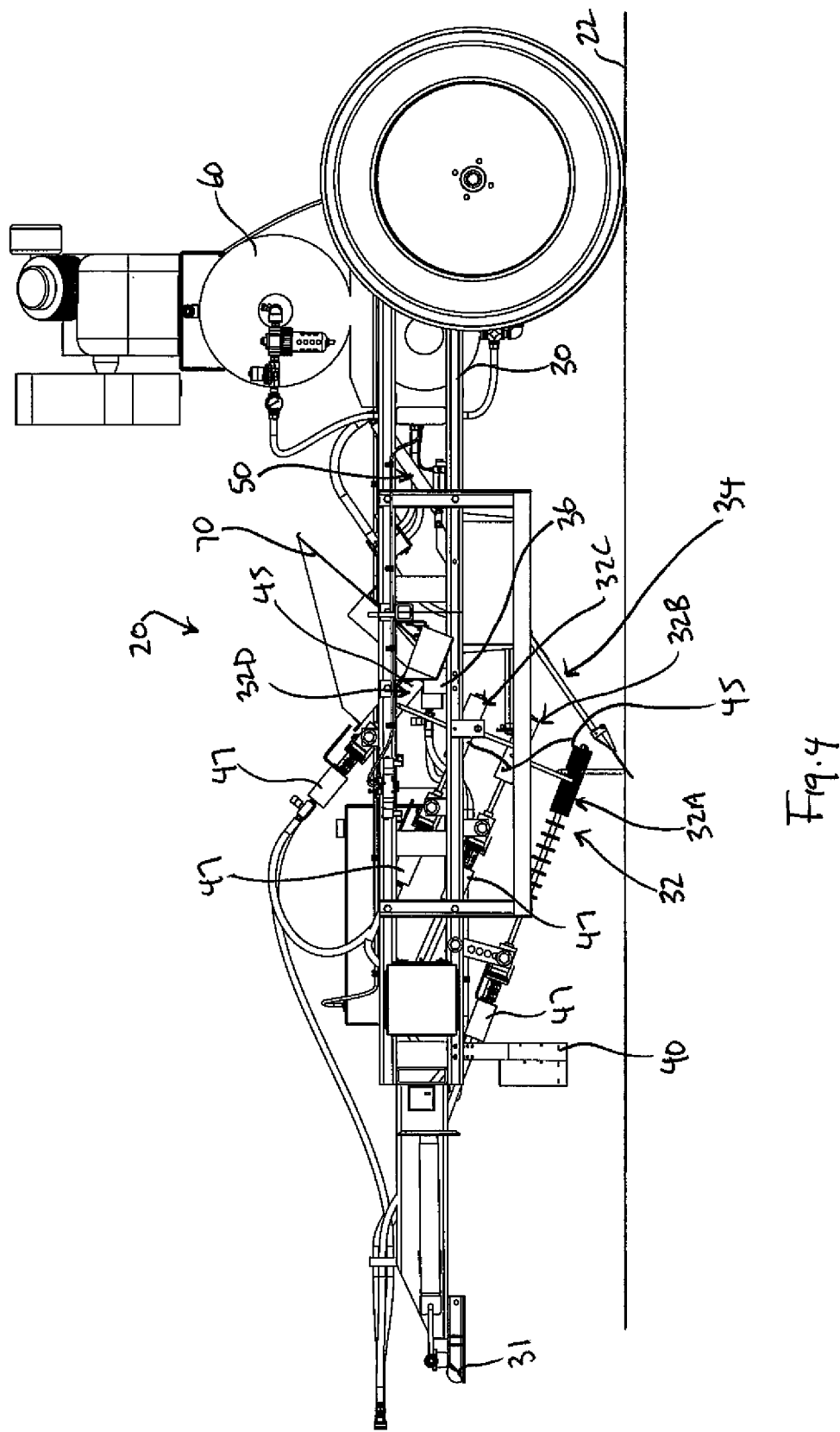
FIG. 4 is a side elevation view of the embodiment of FIG. 1.
Figure 5:
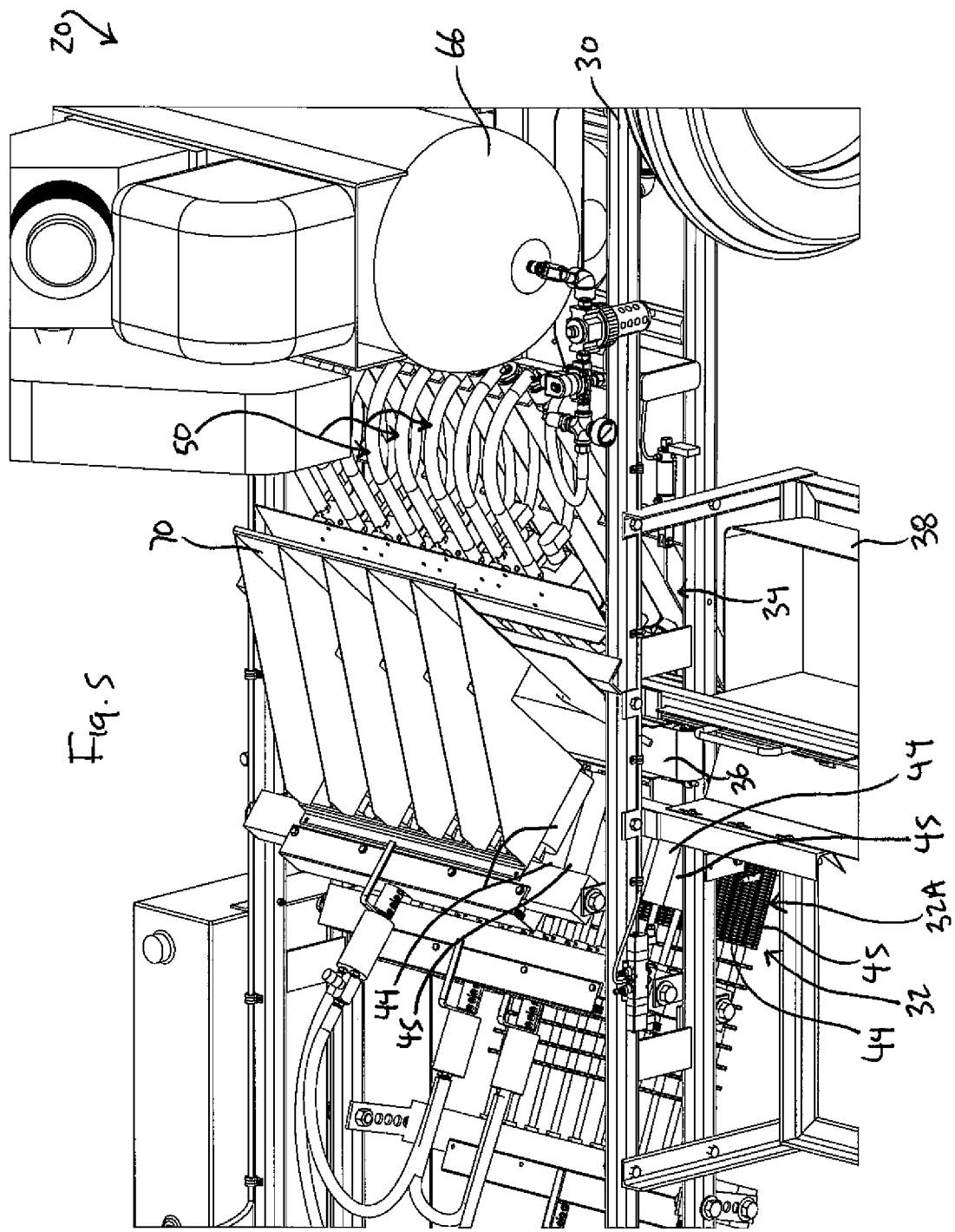
FIG. 5 is an enlarged perspective view of the asparagus harvester corresponding to FIG. 1.

Turning to the drawings, in which like reference characters indicate corresponding elements throughout the various views, FIG. 1 illustrates an asparagus harvester 20 embodying features of the invention. Harvester 20 is configured to harvest asparagus spears growing in ground/field 22 and projecting upwardly therefrom in longitudinal rows or paths. Asparagus harvester 20 is a wheeled machine, which enables it when advanced to roll across ground 22. In this embodiment, harvester 20 is an implement configured to be towed behind a tractor, and it can be configured to be self-propelled in alternate embodiments. In a self-propelled embodiment, for example, an asparagus harvester constructed and arranged in accordance with the principle of the invention can be configured with a propelling unit, one or more fuel tanks, and the other customary attributes of a self-propelled harvester ordinarily controlled by an operator operating suitable controls from a seat, cab or other suitable operator area.

Referring to FIGS. 1-4, harvester 20 includes wheeled frame or chassis 30 incorporating hitch 31 designed to be suitably hitched to a tractor and which is configured to be advanced by being towed over ground 22 along the paths of growing asparagus. Chassis 30 supports pick-up apparatus 32 for engaging and lifting the asparagus spears, severing apparatus 34 for severing the asparagus spears proximate to ground 22 and conveyor 36 for receiving from pick-up apparatus 32 and conveying away asparagus spears severed by severing apparatus 34 to a suitable storage area, which in this example is a lug box 38 supported by chassis 30.

As harvester 20 advances along the rows of growing asparagus spears, some of the asparagus spears are tall enough to project upwardly and to enter generally into alleys or spaces between individual pairs of a transverse series of upright plates 40 in FIG. 1 supported by chassis 30 immediately behind hitch 31. Plates 40 are planar and are disposed longitudinally or parallel to the direction of advance of harvester 20 and are disposed at an appropriate distance above the ground. Plates 40 arranged on chassis 30 immediately to the rear of hitch 31 support standard sensors/detectors connected by appropriate circuitry to a source of power on chassis 30 and through a representative sensor and to an appropriate one of a corresponding number of individual actuators. As harvester 20 advances, the sensors are arranged to not sense/detect the relatively short asparagus spears. Rather, the sensors are arranged to sense/detect the sufficiently tall spears suitable for harvesting, which causes the corresponding sensors to be alerted and the corresponding actuators to be energized in response as is known in the art.

The sensing of an asparagus spear is not necessarily immediate in effect since the sensor and actuator circuit may include a time delay structure. Particularly, this may be a delay dependent upon the amount of rotation of the vehicle wheels (corresponding to an amount of vehicular advance) so that from the time a sensor senses an asparagus spear until the corresponding actuator becomes effective upon that particular spear can be a time lapse of a predetermined or selected amount related to the amount or speed of advance of harvester 20.

Arranged on chassis 30 immediately to the rear of plates 40 is the pick-up apparatus denoted generally at 32. Pick-up apparatus 32 is made up of pick-up beds 32A, 32B, 32C, and 32D arranged one above the other from the lowermost pick-up bed 32A proximate to the ground to the uppermost pick-up bed 32D proximate to conveyor 36 as shown. Pick-up beds 32A, 32B, 32C, and 32D are each part a pick-up unit of harvester 20. In this embodiment, there are four pick-up beds 32A, 32B, 32C, and 32D of four corresponding pick-up units. Pick-up bed 32B is immediately above pick-up bed 32A proximate to the ground, pick-up bed 32C is immediately above pick-up bed 32B, and pick-up bed 32D proximate to conveyor 36 is immediately above pick-up bed 32C. Pick-up beds 32B and 32B between the lowermost pick-up bed denoted at 32A and the uppermost pick-up bed denoted at 32B are intermediate pick-up beds. Although this harvester 20 embodiment includes two intermediate pick-up beds 32B and 32C, pick-up apparatus 32 can include less or more intermediate pick-up beds in alternate embodiments.

Pick-up beds 32A-32D are known in the art and similar in that they are each characterized by a transverse array of pick-up rollers 44 and 45. These are comparable in number to plates 40 and likewise are arranged in counter-rotating pairs. The spaces between certain pairs of the pick-up rollers 44 and 45 are disposed in longitudinal alignment with or centrally of the spaces or alleys between the plates 40. The pick-up rollers 44 and 45 are mounted for rotation about parallel axes lying in longitudinal planes and parallel to each other and arranged, in this example, at an inclination with the aft or trailing portion of the rollers closer to the ground compared to the forward or leading portion of the rollers at a comparatively greater distance from the ground.

Pick-up rollers 44 and 45 that constitute each of pick-up beds 32A, 32B, 32C, and 32D are customarily provided with relatively rigid cores and with surrounding coverings of yieldable, relatively soft material such as foam rubber or the like in the form of pads or fingers for example. Pick-up rollers 44 and 45 are each mounted in suitable journals and carry drive gears all in engagement with a common chain or belt appropriately connected to a drive shaft ultimately driven by a motor 47, which in this embodiment is a hydraulic motor operatively coupled to an appropriate hydraulic system as is known in the art. Pick-up rollers 44 and 45 are simultaneously rotated at substantially the same speed, and the adjacent pick-up rollers 44 and 45 of each pair counter-rotate and thereby move with their closest portions having an upward component as is known in the art.

Figure 6:
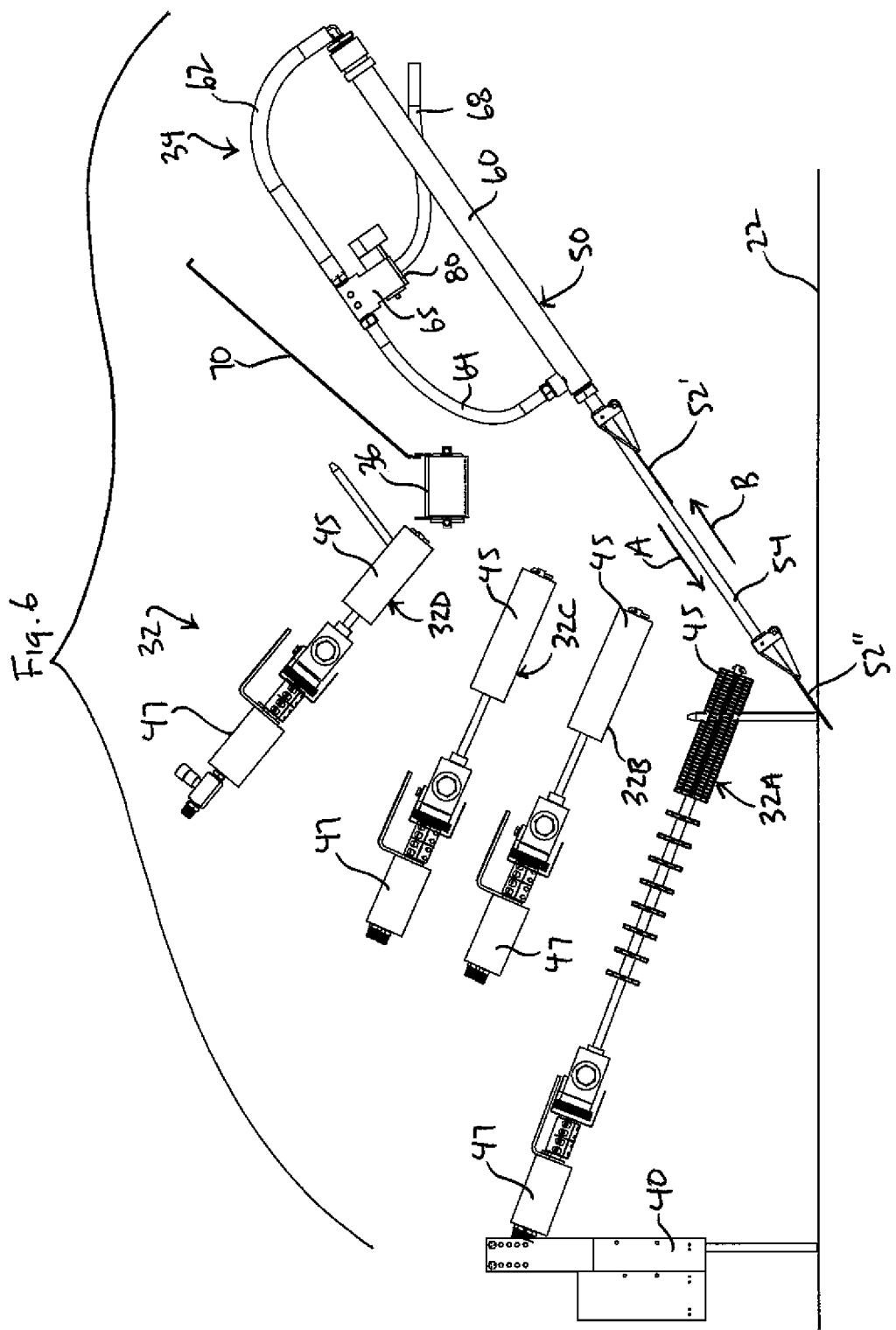
FIG. 6 is a side elevation view of a pick-up apparatus and an asparagus severing assembly removed from the asparagus harvester of FIG. 1 for illustrative purposes.

As harvester 20 advances, brought into action is severing apparatus 34 arranged on chassis 30 immediately to the rear of pick-up apparatus 32. Severing apparatus 34 includes identical severing assemblies 50 arranged in a transverse array with one severing assembly 50 for each of the spaces or alleys between the initial plate 40 pairs. Severing assemblies 50 are identical. Accordingly, severing assembly 50' in FIG. 6 will now be discussed, with the understanding that the ensuing discussion of severing assembly 50' applies in every respect to each severing assembly 50.

Like each severing assembly 50, severing assembly 50' relates to an appropriate alley defined by the appropriate pair of plates 40 of harvester 20 and to a corresponding sensor and actuator and includes a suitable severing blade 52 carried by plunger 54 mounted in pneumatic cylinder 60. Plunger 54 and pneumatic cylinder 60 form a standard and well-known pneumatic cylinder assembly. Conduits 62 and 63 couple pneumatic cylinder 60 through valve unit 65 to a source 66 (FIGS. 1-5) of air under pressure via supply conduit 68. Valve unit 65, which in this example is a model VSS 1/2 AAS 24 VDC 4-way solenoid valve that is readily available under the brand name ALLENAIR or other like/commensurate valve unit, is operatively coupled by standard circuitry to a corresponding actuator in turn operatively by standard circuitry to the sensor corresponding to the assigned alley for severing assembly 50'. Source 66 is a standard air compressor configured in this example to cycle between 135 pounds per square inch (psi) and 175 psi. Valve unit 65 is standard and well-known and configured to switch between a firing position to supply air under pressure from source 66 through conduit 62 to cause plunger 54 to eject outwardly from pneumatic cylinder 60 to move severing blade 52 downwardly in the direction of arrow A along a stroke path from its normally raised set position denoted at 52' to its lowered severing position denoted at 52" proximate to ground 22 for severing one of the asparagus spears in the path and a normal holding position to supply air under pressure from source 66 through conduit 64 to cause plunger 54 to withdraw into pneumatic cylinder 60 to move severing blade 52 upwardly in the direction of arrow B along the stroke path from its lowered severing position denoted at 52" to its normally raised set position denoted at 52'.

As harvester 20 advances along the rows of growing asparagus in the ground 22, the asparagus spears of a pre-selected height of a corresponding row sequentially enter the alley corresponding to severing assembly 50' and trigger the corresponding sensor energizing the corresponding actuator. Valve unit 65 connected by appropriate circuitry to the actuator is controlled by the actuator under the influence of the sensor. When an impulse from the sensor is effective upon the actuator in response to the sensor sensing/detecting an asparagus spear at the alley while harvester 20 advances over the ground, valve unit 65 automatically switches from the normal holding position to the firing position to cause plunger 54 in pneumatic cylinder 60 to eject to cause the connected severing blade 52 to move downwardly in the direction of arrow A along the stroke path from its normally raised set position denoted at 52' in FIG. 6 to its lowered severing position denoted at 52" in FIG. 6 proximate to ground 22 for severing the sensed/detected asparagus spear. Valve unit 54 is configured to automatically switch from its firing position to its normal holding position when the severing blade 52 completes its severing excursion, which immediately restores the severing blade 52 to its normally raised set position denoted at 52' in FIG. 6 from its lowered severing denoted at 52" in FIG. 6.

In the meantime, the spear has been engaged by pick-up apparatus 32, which exerts an upward force on the spear but not to an extent to uproot or break the spear but only to hold and support the spear while severing assembly 50' does its work. The now severed spear is lifted upwardly and carried somewhat rearwardly by pick-up apparatus 32 and cast therefrom onto conveyor 36, which conveys away the spear to lug box 38. This standard and well-known process is repeated for each asparagus spear that triggers the sensor associated with severing assembly 50', further details of which will readily occur to the skilled artisan.

In the general operation of harvester 20, as chassis 30 advances along the rows of growing asparagus in the ground 22, asparagus spears become disposed in appropriate alleys between the appropriate plate 40 pairs. A pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is of a sufficient height to trigger the corresponding sensor is engaged by the pair of adjacent pick-up rollers 44 and 45 of the lowermost pick-up bed 32A, which exert an upward force on the asparagus spear sufficient to hold it without uprooting it, and upon being severed the severing assembly 50 is lifted upwardly thereby and handed off to and lifted in turn by the corresponding pair of adjacent pick-up rollers 44 and 45 of the succeeding pick-up beds 32B, 32C, and 32D, respectively, and ultimately cast onto conveyor 36 from the pair of adjacent pick-up rollers of the uppermost pick-up bed 32D and which transports it to the storage area, which in this example is lug box 38, thereby completing an asparagus spear harvesting operation. In this example, the asparagus spear is cast onto up-angled backstop 70 immediately to the rear of conveyor 36 and which slides down backstop 70 by gravity onto conveyor 36.

Harvester 20 is effective to be advanced, whether by being driven or towed, over ground/field 22 along rows of growing asparagus spears. Harvester 20 is effective to sever the spears at an appropriate position beneath the surface of the soil and to extract or withdraw such severed spears from their growing location and deposit them gently upon conveyor 36 for carriage to eventual storage.

Valve unit 65 is configured to operate at and above an operating temperature, namely, a temperature at and above which valve unit 65 is configured to operate for its intended purpose. In this example, the operating temperature of valve unit 65 is 90 degrees Fahrenheit (° F.). When valve unit 65 is at or above this operating temperature, 90° F. in this example, valve unit 65 is enabled to work for its intended purpose, namely, to completely or otherwise sufficiently switch repeatedly between its firing position and its holding position to enable pneumatic cylinder 60 to completely or otherwise sufficiently actuate plunger 54 repeatedly along the stroke path between the normally raised position of severing blade denoted at 52' and the lowered severing position of severing blade denoted at 52".

It is customary to harvest asparagus spears when the ambient temperature is below the operating temperature of valve unit 65. When the ambient temperature is below the operating temperature of valve unit 65 and inherently chills valve unit 65 to below its operating temperature, valve unit 65 is inherently disabled from reaching and operating at its operating temperature. In other words, when the ambient temperature is below the operating temperature of valve unit 65, the ambient temperature is inherently sufficiently low to disable valve unit 65 from reaching and operating at its operating temperature. Unfortunately, when valve unit 65 is below its operating temperature, the ability of its various moving parts to suitably move is inherently impaired or otherwise disabled which inherently restricts the amount of air that can move through valve unit 65. Accordingly, when valve unit 65 is below its operating temperature, valve unit 65 is inherently impaired or otherwise disabled from completely or otherwise sufficiently switching between its firing position and its holding position which, in turn, inherently disables pneumatic cylinder 60 from completely or otherwise sufficiently actuating plunger 54 along the stroke path of severing blade 52 between the normally raised set position of the severing blade denoted at 52' in FIG. 6 and the lowered severing position of the severing blade denoted at 52" in FIG. 6 and thereby disables severing blade 52 from reaching its lowered severing position to suitably sever growing asparagus spears. This leaves uncut asparagus spears suitable for harvesting and thus unfavorably influences asparagus harvesting.

To suitably solve this "temperature-sensitive" problem related to the effective operation of valve unit 65 associated with severing assembly 50', namely, to avoid unfavorable influences on asparagus harvester by enabling valve unit 65 to completely or otherwise sufficiently switch repeatedly between its firing position and its holding position for enabling pneumatic cylinder 60 to completely or otherwise sufficiently actuate plunger 54 repeatedly along the stroke path between the normally raised position of severing blade denoted at 52' and the lowered severing position of severing blade denoted at 52" in the presence of an ambient temperature that is sufficiently low to disable valve unit 65 from operating at or above its given operating temperature, heater 80 is mounted proximate to valve unit 65. Heater 80 is configured when activated to sufficiently heat valve unit 65 to enable valve unit 65 to operate according to its intended purpose, namely, to switch according to its intended operation between its firing position and its holding position in the presence of an ambient temperature sufficiently low to impair or otherwise disable valve unit 65 from so operating. Valve unit 65 is operatively associated with heater 80 configured to heat valve unit 65 in accordance with the principle of the invention.

In this example, heater 80 is mounted proximate to valve unit 65. Heater 80 is configured when activated to sufficiently heat valve unit 65 to at least its operating temperature over a period of time, such as from approximately 1-30 minutes for example depending how cold valve unit 65 is as dictated by the ambient temperature, before commencing asparagus-harvesting operations to enable valve unit 65 to suitably operate at or above is operating temperature to enable valve unit 65 to suitably switch between its firing position and its holding position to effectuate the desired operation of pneumatic cylinder 60 to actuate plunger 54 to move severing blade 52 along the stroke path between its normally raised set position denoted at 52' in FIG. 6 and its lowered severing position denoted at 52" in FIG. 6 for suitably severing sensed/detected asparagus spears in the presence of an ambient temperature sufficiently low to otherwise impair or disable valve unit 52 from reaching, and operating at, at least its operating temperature and from so operating according to its intended purpose, in accordance with the principle of the invention. Being configured with heater 80, valve unit 65 of severing assembly 50' is a heated valve unit, according to the principle of the invention.

Figure 7:
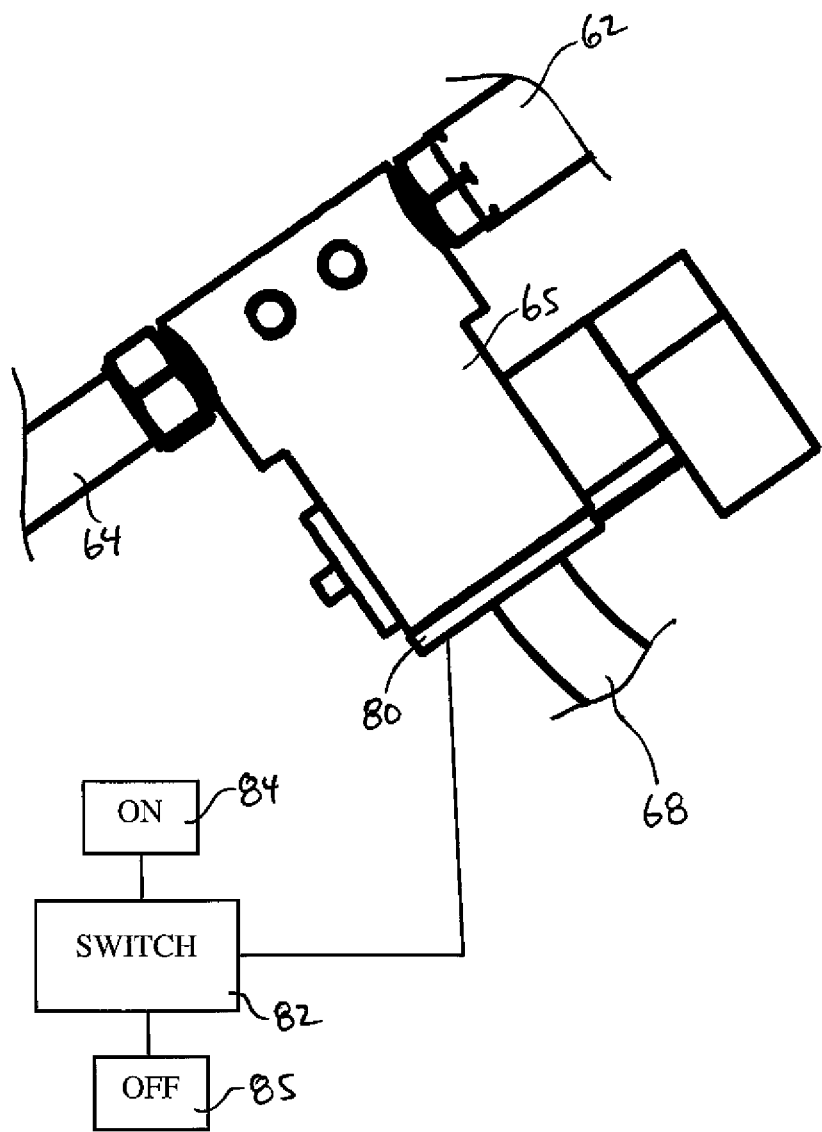
FIG. 7 is an enlarged fragmentary partially diagrammatic view corresponding to FIG. 6 illustrating a valve unit configured with a heater.

Referring to FIG. 7, heater 80 is connected by appropriate circuitry to a source of power on chassis 30 through a suitable switch 82. Heater 80 is configured to activate in response to actuation of switch 82 operatively coupled to heater 80. Switch 82 is configured to be selectively switched between an ON state denoted at 84 to activate heater 80 to sufficiently heat valve unit 65 over a given period of time to at least its operating temperature to enable valve unit 65 to suitably perform its intended functions in the presence of an ambient temperature sufficiently low to sufficiently disable valve unit 65 from operating at or above its operating temperature and thereby sufficiently performing its intended functions described with particularity herein and an OFF state denoted at 85 to deactivate switch 80 when the services of heater 80 are not required, such as when valve unit 65 is sufficiently heated to or above its operating temperature or is otherwise at or above its operating temperature to enable it to suitably perform its intended functions. In this example, switch 82 is a standard toggle switch which can be selectively operated by the operator of harvester 20 as needed.

In this example, heater 80 is a standard, rugged and readily-available positive temperature coefficient (PTC) heater, an efficient and well-known self-regulating heater that runs open-loop without any external diagnostic controls. Heater 80 is connected directly to valve unit 65 in this example by adhering heater 80 directly to valve unit 65 with a suitable thermally-conductive adhesive denoted at 87. Heat generated by heater 80 when activated in response to actuation of switch 82 transmits to valve unit 65 to suitably heat it when needed to at least its suitable operating temperature sufficient to enable valve unit 65 completely or otherwise sufficiently switch repeatedly between its firing position and its holding position for enabling pneumatic cylinder 60 to completely or otherwise sufficiently actuate plunger 54 repeatedly along the stroke path between the normally raised position of severing blade denoted at 52' and the lowered severing position of severing blade denoted at 52".

In the present embodiment disclosed herein by way of illustration and reference, the suitable operating temperate of valve unit 65 disclosed herein is 90 degrees Fahrenheit. The person having ordinary skill in the art will readily appreciate that the suitable operating temperature of the valve unit 65 may vary depending on the commensurate valve unit chosen for valve unit 65 in accordance with the principle of the invention and that heater 80 can be configured when activated to heat the chosen valve unit to its suitable operating temperature according to this disclosure.

The use of thermally-conductive adhesive 87 to connect heater 80 directly to valve unit 65 is easy and efficient, does not impair or interfere with the operation of heater 80 or the transfer of heat from heater 80 to valve unit 65, and does not require the use of mechanical fasteners, brackets or welding that could otherwise impair the operation of either valve unit 65 or heater 80. It is to be understood that each severing assembly 50 of severing apparatus 34 is identically configured with a suitable heater 80 as discussed in conjunction with severing assembly 50'. Each severing assembly 50 can be configured with a dedicated switch 82. In an alternate embodiment, the heaters 80 of the various severing assemblies 50 can be operatively coupled to a single switch 82 configured when actuated to concurrently activate the various heaters 80. If desired, each valve unit and its attached heater of each of the severing assemblies 50 can be configured with be insulated to retain heat, such as by the application of insulation or an insulative jacket for example.

Figure 8:
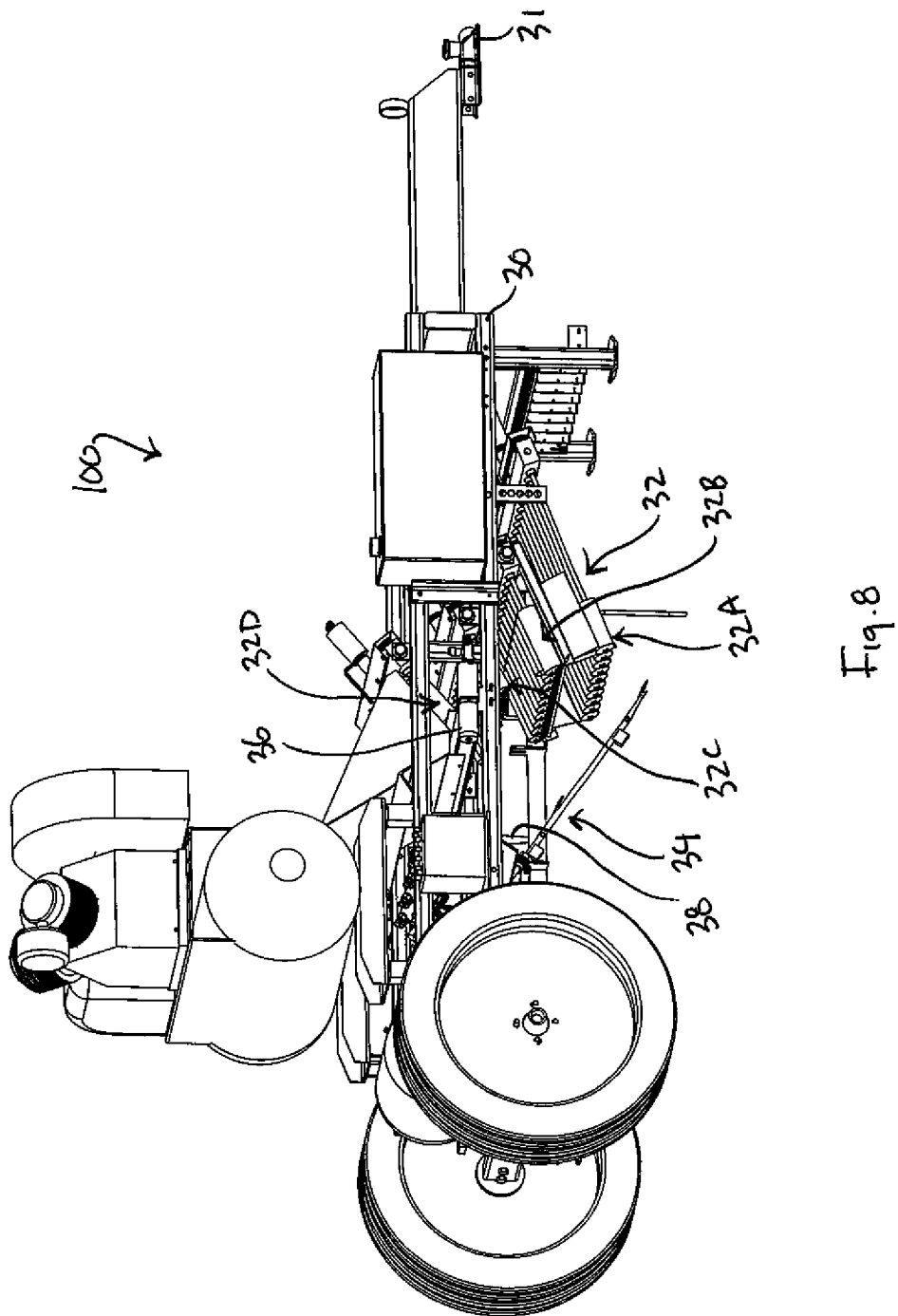
FIG. 8 is a perspective view of another embodiment of an asparagus harvester embodying features of the invention.

Reference is now directed to FIG. 8 illustrating an alternate embodiment of an asparagus harvester denoted generally at 100. In common with harvester 20, harvester 100 shares chassis 30, hitch 31, pick-up apparatus 32, including pick-up beds 32A, 32B, 32C, and 32D, severing apparatus 34, conveyor 36, lug box 38, and the various appurtenances thereof as previously described. As seen in FIG. 8 and also in FIG. 9, which is an enlarged fragmentary view corresponding to FIG. 8 illustrating portions of pick-up apparatus 32 in greater detail, pick-up apparatus 32 is configured with spear guides 110 and 112 and interference or interfering member 114. In this example, pick-up bed 32B immediately above lowermost pick-up bed 32A of pick-up apparatus 32 is configured with spear guides 110 and 112 and interference/interfering member 114.

Referring in relevant part to FIGS. 9-12, pick-up bed 32B, like each pick-up bed of pick-up apparatus 32, is characterized by the previously-described pick-up rollers 44 and 45. Pick-up rollers 44 and 45 are arranged in a transverse array from one side of pick-up bed 32B, denoted generally at 120, to the other side of pick-up bed 32B, denoted generally at 122, and are mounted for rotation about parallel axes X and Y, respectively, lying in longitudinal planes and parallel to each other. The opposite sides 120 and 122 of pick-up bed 32B also inherently define parts of the opposite sides of pick-up apparatus 32 defined collectively by the opposite sides of the various pick-up beds 32A, 32B, 32C, and 32D. Pick-up rollers 44 and 45 together define a leading or forward end of pick-up bed 32B denoted generally at 130, a trailing or aft end of pick-up bed 32B denoted generally at 132, and a length L of pick-up bed 32B in FIG. 11 extending rearwardly and longitudinally, as well as along the path of growing asparagus when harvester 100 brought to service to harvest growing asparagus spears, from leading end 130 to trailing end 132. The opposite leading and trailing ends 130 and 132 of pick-up bed 32B inherently constitute parts of the opposite leading and trailing ends of pick-up apparatus 32 collectively defined by the leading and trailing ends of the various pick-up beds 32A, 32B, 32C, and 32D.

As described previously, pick-up rollers 44 and 45 that constitute pick-up bed 32B, and also pick-up beds 32A, 32C, and 32D for that matter, form part of a pick-up unit and are each mounted for rotation in suitable journals 140 of a housing assembly 142 immediately to the front of pick-up rollers 44 and 45 and carry drive gears, housed in housing assembly 142, all in engagement with a common chain or belt, housed in housing assembly 142, appropriately connected to a drive shaft ultimately driven by motor 47 mounted to housing assembly 142. Pick-up rollers 44 and 45 are simultaneously rotated about axes X and Y, respectively, at substantially the same speed by motor 47, and the adjacent pick-up rollers 44 and 45 of each pair counter-rotate about the respective axes X and Y and thereby move with their closest portions having an upward component as is known in the art and described previously in conjunction with harvester 20. All of this is the same for each of pick-up beds 32A, 32B, 32C, and 32D. Spear guides 110 and 112 are disposed on either side of pick-up apparatus 32 for guiding the asparagus spears severed by severing apparatus 34 through pick-up apparatus 32 and currently disable the asparagus spears severed by severing apparatus 34 from ejecting laterally outward from either side of pick-up apparatus in the directions of arrows C and D in FIG. 9. Spear guides 110 and 112 are disposed on either side of pick-up apparatus 32 between pick-up beds 32A and 32B in this example.

Figure 12:
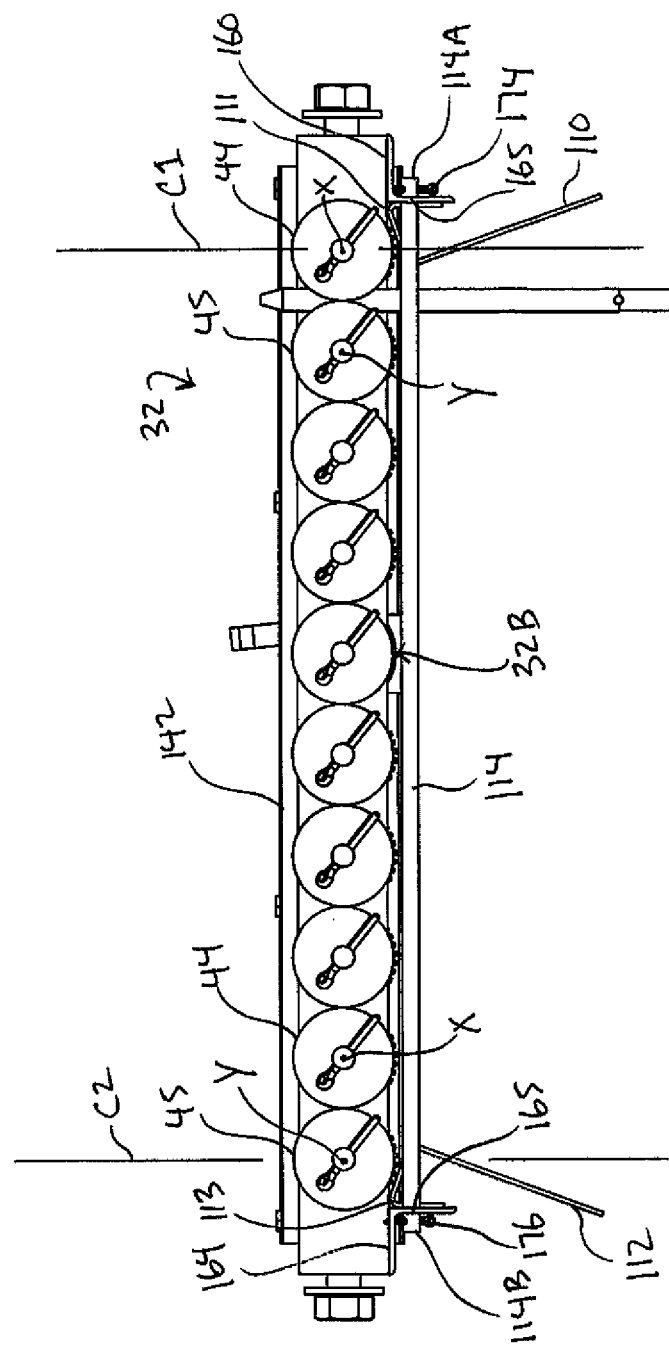
FIG. 12 is a rear elevation view of the embodiment of FIG. 10.

With continuing reference in relevant part to FIGS. 9-12, spear guides 110 and 112 are identical and are coextensive panels or shields of metal, which are each preferably flat and generally rectangular in shape in this example. Spear guides 110 and 112 are disposed proximate to the respective sides 120 and 121 of pick-up bed 32B, are axially-aligned, and depend downwardly from proximate to the respective sides 120 and 122 from under the respective outermost rollers 44 and 45 just inboard or otherwise inside of their respective longitudinal centerlines C1 and C2 and their respective axes of rotation X and Y in FIG. 12 present along the respective centerlines C1 and C2. Spear guides 110 and 112 project not only downwardly from just inboard or otherwise inside of their respective longitudinal centerlines C1 and C2 and their respective axes of rotation X and Y in FIG. 12 but also angularly outward therefrom and from the respective sides 120 and 122 of pick-up bed 32B. Spear guides 110 and 112 additionally extend forwardly along length L of pick-up bed 32B from proximate to trailing end 132 and to and beyond leading end 130 to between leading end 130 and housing assembly 142.

In this embodiment, spear guides 110 and 112 are mounted to and supported by support members 160 and 164 mounted proximate to the respective sides 120 and 122 of pick-up bed 32B. Support members 160 and 164 are parallel relative to one another, are rigid, rugged and elongate, are rigidly affixed to either end of housing assembly 142, such as by welding, fasteners, or the like, and project rearwardly from either end of housing assembly 142 along the respective sides 120 and 122 of pick-up bed 32B and terminate at outer ends 161 and 165, respectively, proximate to trailing end 132 of pick-up bed 32B. Spear guides 110 and 112 concurrently depend downwardly, and angularly outward as previously described, from respective upper ends 111 and 113 affixed to the respective support members 160 and 164 between housing assembly 142 and outer ends 161 and 165, respectively.

Figure 9:
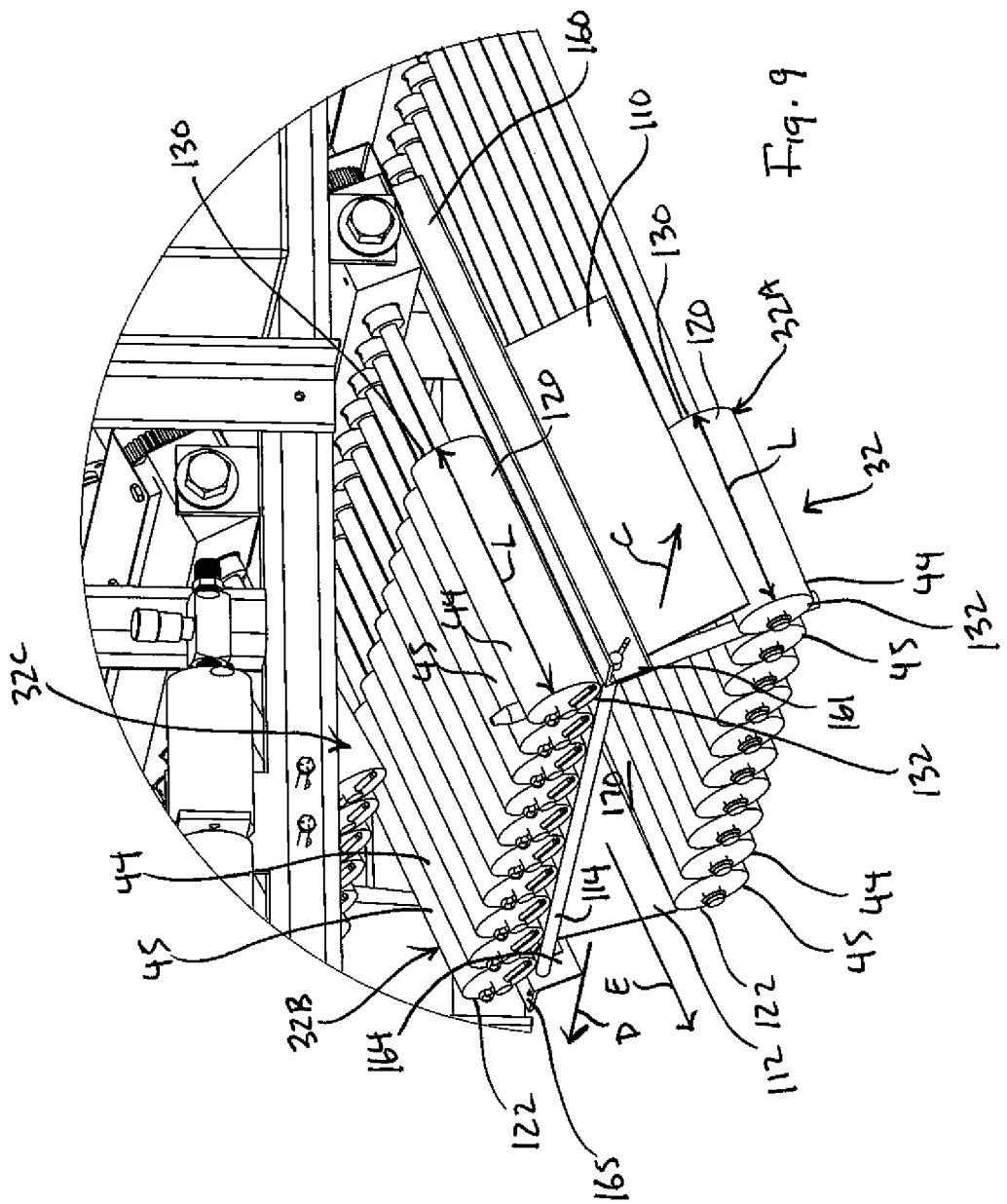
FIG. 9 is an enlarged fragmentary view corresponding to FIG. 8 illustrating pick-up beds of a pick-up apparatus.

In pick-up apparatus 32 in FIG. 9, spear guides 110 and 112 are present between pick-up beds 32A and 32B proximate to their respective sides 120 and 122. Spear guides 110 and 112 depend downwardly and angularly outward from the respective upper ends 111 and 112 affixed to the respective support members 160 and 164 from proximate to the respective sides 120 and 122 of pick-up bed 32B from under the respective outermost rollers 44 and 45 to along the respective sides 120 and 122 of the immediately subjacent lowermost pick-up bed 32A proximate to the outer side of its respective outermost rollers 44 and 45 at the respective sides 120 and 122. Spear guides 110 and 112 concurrently extend forwardly along lengths L of the respective pick-up beds 32B and 32A along the respective sides 120 and 122 of pick-up beds 32B and 32A from proximate to trailing ends 132 of the respective pick-up beds 32B and 32A and to and beyond the leading ends 130 of the respective pick-up beds 32B and 32A to define a spear-conveying area 170 in FIG. 10 that is laterally-enclosed on either side of pick-up apparatus 32 by spear guides 110 and 112 extending between pick-up beds 32B and 32A proximate to sides 120 and 122 of the respective pick-up beds 32B and 32A, according to the principle of the invention.

In the general operation of harvester 100 as first described above in conjunction with harvester 20, as chassis 30 advances along the rows of growing asparagus in the ground, asparagus spears become disposed in the appropriate alleys. A pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is of a sufficient height to trigger the corresponding sensor is engaged by the pair of adjacent pick-up rollers 44 and 45 of the lowermost pick-up bed 32A, which exert an upward force on the asparagus spear sufficient to hold it without uprooting it, and upon being severed by the severing assembly 50 is lifted upwardly thereby and handed off to and lifted in turn by the corresponding pair of adjacent pick-up rollers 44 and 45 of the succeeding pick-up beds 32B, 32C, and 32D, respectively, and ultimately cast onto conveyor 36 from the pair of adjacent pick-up rollers of the uppermost pick-up bed 32D and which transports it to the storage area. Pick-up rollers 44 and 45 of lowermost pick-up bed 32A lift severed asparagus spears from the ground and into and through spear-conveying area 170 enclosed laterally on sides 120 and 121 by spear guides 110 and 112 to the immediately superjacent pick-up bed 32B which, in turn, picks up the spears and lifts and transfers them to the next immediately superjacent pick-up bed 32C. Spear guides 110 and 112 between pick-up beds 32A and 32B on the respective sides 120 and 122 of each of pick-up beds 32A and 32B and thereby inherently on either side of pick-up apparatus 32 in FIG. 9 suitably guide severed asparagus spears lifting upwardly by pick-up rollers 44 and 45 proximate to the respective sides 120 and 122 from lowermost pick-up bed 32A and to the corresponding pick-up rollers 44 and 45 of pick-up bed 32B of pick-up apparatus 32. At the same time, pick-up guides 110 and 112 disable the severed asparagus spears so advancing upwardly through spear-conveying area 170 from the pick-up rollers 44 and 45 of lowermost pick-up bed 32A to the corresponding pick-up rollers 44 and 45 of the immediately superjacent pick-up bed 32B from ejecting laterally outward from between pick-up beds 32A and 32B from the spear-conveying area 170 from either of sides 120 and 121 of the respective pick-up bed 32A and 32B, and thus from either side of pick-up apparatus 32, in the opposite directions of arrows C and D, respectively, in FIGS. 9 and 10, thereby favorably influencing asparagus spear loss in accordance with the principle of the invention. Although spear guides 110 and 112 are disclosed between adjacent pick-up beds 32A and 32B to define laterally-enclosed spear-conveying area 170 therebetween in FIG. 9, suitable spear guides can be similarly disposed between any of the adjacent pick-up beds of pick-up apparatus 32 to define the appropriate laterally-enclosed spear-conveying area therebetween as may be desired.

Figure 10:
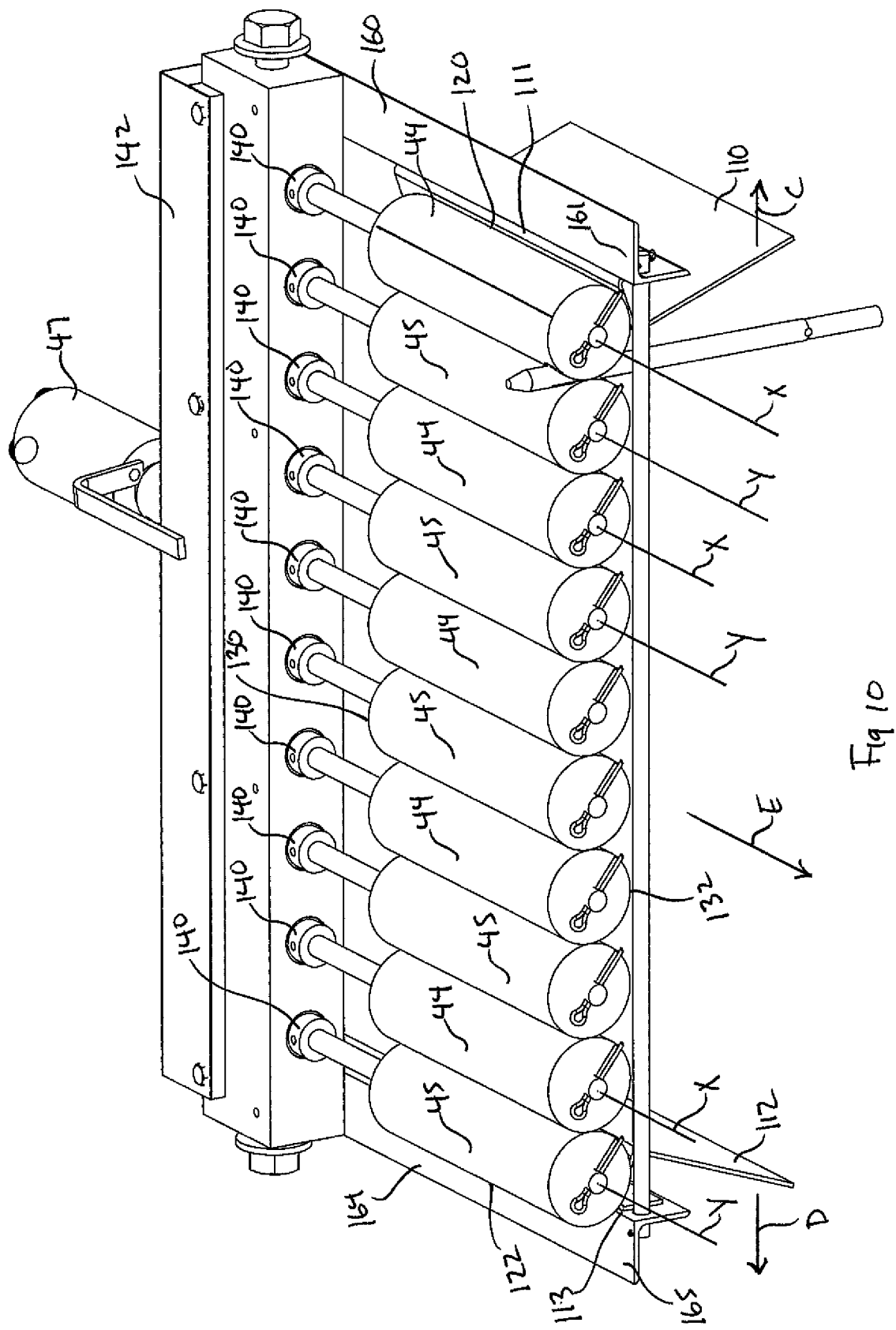
FIG. 10 is a perspective view of one of the pick-up beds illustrated in FIG. 9 incorporating spear guides and an interfering member.
Figure 11:
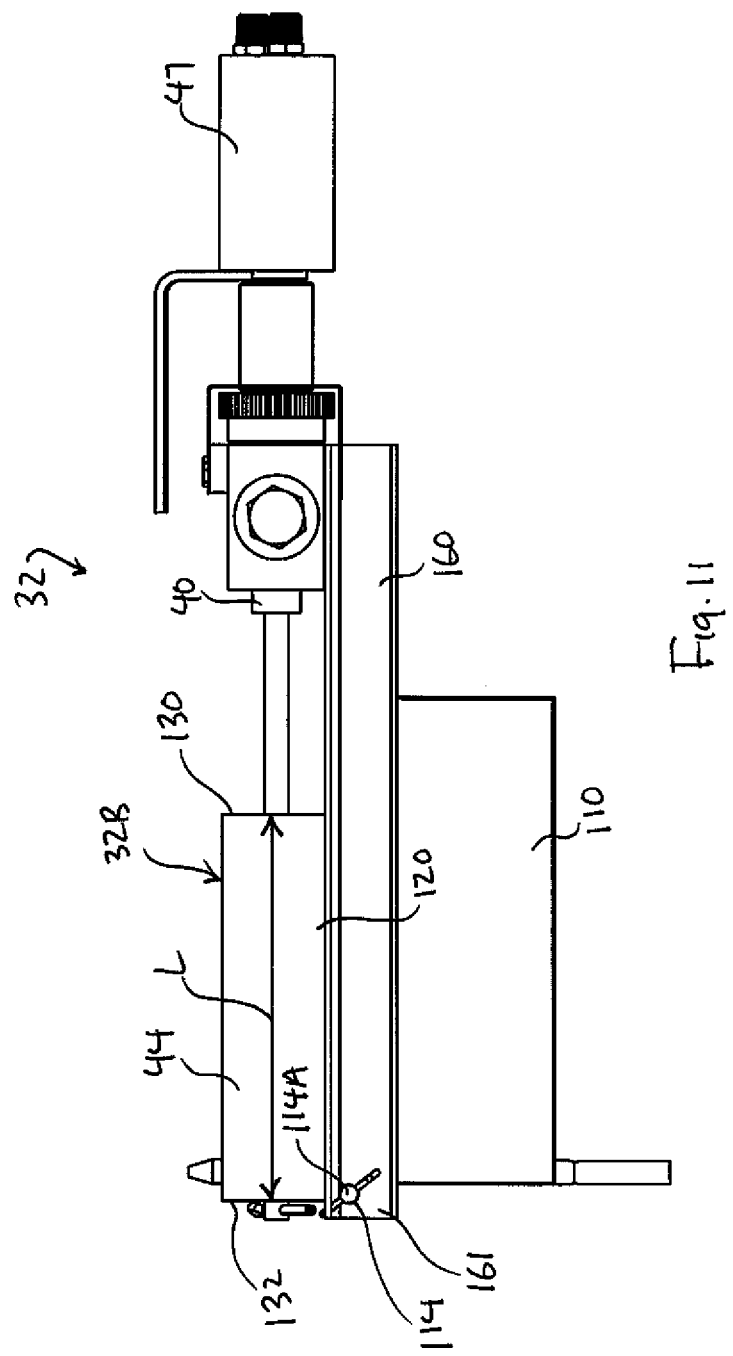
FIG. 11 is a side elevation view of the embodiment of FIG. 10, the opposite side elevation being the same thereof.

Referring in relevant part to FIGS. 9, 10, and 12, interfering member 114 extends across trailing end 132 of pick-up bed 32B from side 120 to side 12 and is configured to disable spears severed by severing apparatus 34 and being lifted through pick-up rollers 44 and 45 of pick-up bed 32B between leading end 130 and trailing end 132 from inadvertently passing outwardly and rearwardly in the direction of arrow E in FIGS. 9 and 10 through trailing end 132 of pick-up bed 32B and onto the ground only to become lost, thereby favorably influencing asparagus spear loss in accordance with the principle of the invention. In other words, interfering member 114 extends across trailing end 132 of pick-up bed 32B across the trailing ends of the various pick-up rollers 44 and 45 from side 120 to side 121 to keep severed asparagus spears entrained between the spaces of various pick-up rollers 44 and 45 and prevent them from discharging rearwardly from between the various pick-up rollers 44 and 45 and relieved from their entrainment while they are being lifted. Interfering member 114 is a longitudinally straight elongate bar carried or otherwise supported by support members 160 and 164. In this example, interfering member 114 has opposed ends 114A and 114B. End 114A is connected to outer end 161 of support member 160 disposed proximate to side 120 of pick-up bed 32B and end 114B, end 114B is connected to outer end 161 of support member 164 disposed proximate to side 122 of pick-up bed 32B. Interfering member 114 extends transversely across trailing end 132 of pick-up bed 32 from end 114A connected to outer end 161 of support member 160 proximate to side 120 of pick-up bed 32B to end 114B connected to outer end 165 of support member 164 proximate to side 122. In this embodiment, ends 114A and 114B extend through appropriate holes in the respective outer ends 161 and 165 and are secured with removable pins 174 and 176, respective, shown in FIG. 12. Ends 114A and 114B can be secured by other methods in alternate embodiments, such as by welding if so desired.

The trailing end 132 of the lowermost pick-up bed 32A has no interfering member for enabling short asparagus spears not severed by severing apparatus 34 to pass outwardly through its trailing end 12 from between rollers 44 and 45. Although only pickup bed 32B immediately above lowermost pickup bed 32A incorporates interfering member 114, pick-up beds 32C and 32D can be selectively configured with an interfering member if desired.

The present invention is described above with reference to illustrative embodiments. those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. In an asparagus harvester for harvesting asparagus spears growing in the ground and projecting upwardly therefrom in a path, the asparagus harvester including a chassis configured to be advanced over the ground along said path and supporting a pick-up apparatus for engaging and lifting the asparagus spears, a severing assembly for severing the asparagus spears proximate to the ground and a conveyor for receiving from the pick-up apparatus and conveying away asparagus spears severed by the severing assembly, the severing assembly including a severing blade carried by a plunger mounted in a pneumatic cylinder, and conduits coupled to the pneumatic cylinder and through a valve unit to a source of air under pressure, the valve unit configured to operate at an operating temperature of at least 90° F. to enable the valve unit to sufficiently switch between a firing position to supply air under pressure from the source through one of the conduits to cause the plunger to eject outwardly from the pneumatic cylinder to move the severing blade downwardly along a stroke path from a raised set position to a lowered severing position proximate to the ground for severing one of the asparagus spears in the path and a holding position to supply air under pressure from the source through another one of the conduits to cause the plunger to withdraw into the pneumatic cylinder to move the severing blade upwardly along the stroke path from the lowered severing position to the raised set position, improvements therein comprising a heater mounted proximate to the valve unit and configured to sufficiently heat the valve unit to at least the operating temperature to enable the valve unit to sufficiently switch between the firing position and the holding position for favorably influencing asparagus harvesting by the asparagus harvester in the presence of an ambient temperature sufficiently low to cause the valve unit to operate at a temperature below the operating temperature disabling the valve unit from sufficiently switching between the firing position and the holding position in the absence of being heated by the heater to at least the operating temperature.

2. The improvements according to claim 1, wherein the heater is configured to activate in response to actuation of a switch operatively coupled to the heater.

3. The improvements according to claim 1, wherein the heater is connected to the valve unit.

4. The improvements according to claim 3, wherein the heater is connected to the valve unit with a thermally-conductive adhesive.

5. The improvements according to claim 1, wherein the heater comprises a positive temperature coefficient heater.

6. In an asparagus harvester for harvesting asparagus spears growing in the ground and projecting upwardly therefrom in a path, the asparagus harvester including a chassis configured to be advanced over the ground along said path and supporting a pick-up apparatus for engaging and lifting the asparagus spears, a severing assembly for severing the asparagus spears proximate to the ground and a conveyor for receiving from the pick-up apparatus and conveying away asparagus spears severed by the severing assembly, the severing assembly including a severing blade carried by a plunger mounted in a pneumatic cylinder, and conduits coupled to the pneumatic cylinder and through a valve unit to a source of air under pressure, the valve unit configured to operate at an operating temperature of at least 90° F. to enable the valve unit to sufficiently switch between a firing position to supply air under pressure from the source through one of the conduits to cause the plunger to eject outwardly from the pneumatic cylinder to move the severing blade downwardly along a stroke path from a raised set position to a lowered severing position proximate to the ground for severing one of the asparagus spears in the path and a holding position to supply air under pressure from the source through another one of the conduits to cause the plunger to withdraw into the pneumatic cylinder to move the severing blade upwardly along the stroke path from the lowered severing position to the raised set position, a method comprising:

favorably influencing asparagus harvesting by the asparagus harvester in a presence of an ambient temperature sufficiently low causing the valve unit to operate at a temperature below the operating temperature disabling the valve unit from sufficiently switching between the firing position and the holding position by mounting a heater proximate to the valve unit and activating the heater, the heater sufficiently heating the heater over a period of time to at least the operating temperature enabling the valve unit to sufficiently switch between the firing position and the holding position.

7. The method according to claim 6, wherein the heater is configured to activate in response to actuation of a switch operatively coupled to the heater, and the step of activating the heater comprises actuating the switch.

8. The method according to claim 6, wherein the step of mounting the heater proximate to the valve unit further comprises connecting the heater to the valve unit.

9. The method according to claim 8, wherein the step of connecting the heater to the valve unit comprises adhering the heater to the valve unit with a thermally-conductive adhesive.

10. The improvements according to claim 6, wherein the heater comprises a positive temperature coefficient heater.

* * * * *